(12) United States Patent  
Sorhuus et al.

(10) Patent No.: US 9,115,437 B2  
(45) Date of Patent: Aug. 25, 2015

(54) RAW GAS COLLECTION SYSTEM

(75) Inventors: Anders Kenneth Sorhuus, Ski (NO); Geir Wedde, Oslo (NO); Odd Edgar Bjarno, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 242 days.

(21) Appl. No.: 13/824,969

(22) PCT Filed: Sep. 14, 2011

(86) PCT No.: PCT/IB2011/002138  
§ 371 (c)(1),  
(2), (4) Date: Apr. 16, 2013

(87) PCT Pub. No.: WO2012/035411  
PCT Pub. Date: Mar. 22, 2012

(65) Prior Publication Data  
US 2013/0199939 A1   Aug. 8, 2013

(30) Foreign Application Priority Data  
Sep. 17, 2010   (EP) ..................... 10177378

(51) Int. Cl.  
*C25C 3/22* (2006.01)  
*F27B 14/08* (2006.01)  
*F27D 17/00* (2006.01)

(52) U.S. Cl.  
CPC . *C25C 3/22* (2013.01); *F27B 14/08* (2013.01); *F27D 17/001* (2013.01); *F27D 17/004* (2013.01)

(58) Field of Classification Search  
USPC ........................................... 205/391  
See application file for complete search history.

(56) References Cited

U.S. PATENT DOCUMENTS 2,031,554 A * 2/1936 Torchet .................. 423/116  
4,176,034 A 11/1979 Stoger et al.  
4,447,301 A * 5/1984 Shen ....................... 205/336  
(Continued)

FOREIGN PATENT DOCUMENTS

CN   2911599 Y   6/2007  
DE   19845258 C1   3/2000  
(Continued)

OTHER PUBLICATIONS

Machine translation of DE 19845258 C1.*

(Continued)

*Primary Examiner* — Harry D Wilkins, III

(57) ABSTRACT

A raw gas collection system (15) for collecting raw gas from a plurality of aluminum smelting pots (4) is equipped with a plurality of branch ducts (16, 16a-d). Each branch duct (16, 16a-d) is arranged to channel a respective branch flow (32, 32a-b) of raw gas from an aluminum smelting pot (4) to a collecting duct (20a), which is common to and shared by branch ducts (16, 16a-d). Several of the branch ducts (16, 16a-d) are equipped with a combined heat transfer and flow resistance generating element (17) to remove heat from the respective branch flow (32, 32a-b) of raw gas and to balance the flow of raw gas in the raw gas collecting system (15). The combined heat transfer and flow resistance generating elements (17) reduce the need for adjusting the respective branch duct (16, 16a-d) flow volumes using dampers, thereby reducing the power required to transport the raw gas through the system.

12 Claims, 3 Drawing Sheets

(56) References Cited

U.S. PATENT DOCUMENTS

| | | | |
|---|---|---|---|
| 4,668,352 A * | 5/1987 | Duprat et al. | 205/336 |
| 2009/0159434 A1* | 6/2009 | Girault et al. | 204/228.3 |
| 2010/0101760 A1* | 4/2010 | Wedde et al. | 165/104.19 |

FOREIGN PATENT DOCUMENTS

| JP | H01104795 A | 4/1989 | |
|---|---|---|---|
| WO | 2008113496 A1 | 9/2008 | |
| WO | WO 2008/113496 A1 * | 9/2008 | C25C 3/22 |

OTHER PUBLICATIONS

Geankoplis, Transport Processes and Unit Operations, 1993 (no month available), pub. By Prentic Hall, Third Edition, pp. 84-85.*
International Search Report and Written Opinion, International Searching Authority, PCT Application No: PCT/IB2011/002138, European Searching Authority, Completed Dec. 6, 2011, Authorized Officer Olivier Crottaz.
European Search Report, European Searching Authority, EP Application No: 10177378, Search Completed Dec. 2, 2010, The Hague.
Office action issued from Chinese Patent Office dated Feb. 2, 2015 for CN Application No. 201180055268.X.

* cited by examiner ated to International Application No. PCT/IB2011/002138 having an International Filing Date of Sep. 14, 2011, incorporated herein in its entirety by reference.

RAW GAS COLLECTION SYSTEM

This is a US National Phase application claiming priority to International Application No. PCT/IB2011/002138 having an International Filing Date of Sep. 14, 2011, incorporated herein in its entirety by reference.

FIELD OF THE INVENTION

The present invention relates to a raw gas collection system for collecting raw gas from a plurality of aluminium smelting pots. A plurality of branch ducts is adapted to channel raw gas from a respective aluminium smelting pot. A common collecting duct channels the raw gas from the plurality of branch ducts to a gas cleaning unit.

The present invention also relates to a method for balancing a flow of raw gas in a raw gas collection system, and to the use of a plurality of combined heat transfer and flow resistance generating elements for balancing a plurality of branch flows of raw gas in a raw gas collection system.

BACKGROUND

Aluminium may be produced by electrolytic reactions in electrolytic smelting pots, using the Hall-Héroult process. The process produces raw gas in the form of hot, particle-laden raw gas, which is cleaned in a gas cleaning unit before being discharged to the atmosphere. A duct system is usually used for channeling the hot, particle-laden raw gas from the smelting pots to the gas cleaning unit.

A typical gas cleaning unit may comprise a dry scrubber and a dust filter, e.g. a fabric filter that may be of the bag filter type. A consideration of such systems is that energy-consuming fans are often necessary in connection with raw gas treatment systems in order to actively draw the raw gas through the gas cleaning unit. Such is the case since the raw gas collecting ducts and the raw gas cleaning unit may introduce flow resistance in flue gas collection and cleaning systems.

Still another consideration is that raw gas treatment systems may require that the raw gas is cooled before entering the raw gas cleaning system. This requirement may be dictated by, for example, the temperature sensitivity of any downstream equipment, or by the temperature dependency of the cleaning efficiency of the gas cleaning unit. It is known to cool hot raw gas produced by aluminium smelting pots by mixing cool ambient air into the raw gas ducts upstream of a gas cleaning unit. Gas/air mixing is relatively simple, but for high gas temperatures the volume of ambient air required to provide adequate cooling becomes substantial, and so does the increase in cooled raw gas volume. Hence, as the volume of raw gas is increased, there must also be a corresponding increase in the size of the gas cleaning unit, the downstream fans that pull the gas through the gas cleaning unit, and the plant energy consumption. The energy consumption of an aluminium production plant may be substantial and it is desirable to find areas where the energy consumption may be lowered.

SUMMARY

According to aspects described and illustrated herein, the above drawbacks and deficiencies of the prior art are at least partially overcome or alleviated by the subject raw gas collection system for collecting raw gas from a plurality of aluminium smelting pots. The subject raw gas collection system comprises a plurality of branch ducts, each branch duct being fluidly connected to a respective aluminium smelting pot of the plurality of aluminium smelting pots, each of the branch ducts being adapted to channel raw gas from a respective branch duct inlet at the smelting pot to a respective branch duct outlet; and a first common collecting duct fluidly connected to the plurality of branch ducts at the respective branch duct outlets, the first common collecting duct being adapted to channel the raw gas, in a common direction of flow as the direction of flow of raw gas in a collecting duct flow direction, from the branch duct outlets towards a gas cleaning unit. A branch duct outlet of a first branch duct of said plurality of branch ducts is located downstream of a branch duct outlet of a second branch duct of the plurality of branch ducts as seen in the collecting duct flow direction of raw gas in the collecting duct. The first branch duct is provided with a first combined heat transfer and flow resistance generating element adapted to generate, in combination with the first branch duct, a first total flow resistance from the branch duct inlet to the branch duct outlet of the first branch duct, and to transfer heat from a first branch flow of raw gas to a heat transfer medium. The first total flow resistance is larger than a second total flow resistance of the second branch duct from the branch duct inlet to the branch duct outlet of the second branch duct.

The raw gas collection system makes it possible to adjust a particular branch duct among a plurality of branch ducts to a particular flow resistance. Since the first branch duct and the second branch duct are fluidly connected to the same common collecting duct, it is possible to balance the raw gas flow volumes from the first and second branch ducts by tuning the flow resistance by means of the combined heat transfer and flow resistance generating element for the first branch duct. Moreover, the first combined heat transfer and flow resistance generating element may be adapted to cool the hot raw gas produced in that smelting pot which is provided with the first branch duct. Thus, the first combined heat transfer and flow resistance generating element increases the flow resistance for the first branch duct in a useful manner, and reduces the need for otherwise useless flow resistance introduced by, for example, a duct regulation damper, in order to compensate for the pressure drop along the collecting duct. In other words, the raw gas collection system not only cools the raw gas but also reduces the need for duct regulation dampers, which in turn reduces the total energy consumption of the raw gas collecting system.

Moreover, having a combined heat transfer and flow resistance generating element at a branch duct may allow the heat transfer and flow resistance generating element to be quite small and thus included in the existing smelting pot structure, which reduces costs. Moreover, having a combined heat transfer and flow resistance generating element at one particular branch duct may affect only the particular smelting pot to which the branch duct is fluidly connected. Thus, only that particular smelting pot is affected from eventual malfunctions or maintenance work, and thus less emphasis need be focused on access and bypass possibilities. Likewise, the design of the combined heat transfer and flow resistance generating element may be optimized in view of efficient heat transfer rather than in view of avoiding scale problems.

In one embodiment, the second branch duct is provided with a second combined heat transfer and flow resistance generating element adapted to generate, in combination with the second branch duct, the second total flow resistance from the branch duct inlet to the branch duct outlet of the second branch duct, and to transfer heat from a second branch flow of raw gas to a heat transfer medium. An advantage of this embodiment is that also the second branch flow is cooled, prior to being channeled to the gas cleaning unit. Even though each of the individual combined heat transfer and flow resistance generating elements introduce a pressure drop in the respective branch ducts, the total pressure drop in the system may be lowered as compared to having a single heat exchanger in a header duct.

In one embodiment, at least 10% of all branch ducts of the plurality of branch ducts are provided with a respective combined heat transfer and flow resistance generating element. Such an arrangement provides for efficient cooling of the raw gas and efficient balancing of raw gas flow volumes between branch ducts. It is possible that at least one of the branch ducts comprise a damper for fine tuning flow resistance of the respective branch flow of raw gas.

In one embodiment, the plurality of branch ducts comprises 5-500 branch ducts fluidly connected to the first common collecting duct, each branch duct being specific for a particular smelting pot, wherein at least 10% of the branch ducts of said plurality of branch ducts are provided with a respective combined heat transfer and flow resistance generating element, wherein the respective total flow resistance of each branch duct provided with a respective combined heat transfer and flow resistance generating element is adapted to be higher than the total flow resistance of an upstream located branch duct. "Upstream located branch duct" as used herein means that the respective branch duct outlet is located upstream with respect to the flow of raw gas in the common collecting duct. Each of the combined heat transfer and flow resistance generating elements has a heat transfer element adapted to generate, in combination with the respective branch duct, a total flow resistance, and to transfer heat from a respective branch flow of raw gas to a heat transfer medium.

In one embodiment of the raw gas collection system, each of the plurality of branch ducts is provided with a respective combined heat transfer and flow resistance generating element. It may be advantageous to have combined heat transfer and flow resistance generating elements provided on a plurality of branch ducts in the raw gas collection system since the branch ducts are fluidly connected to the common collecting duct. Thus, it may be possible to balance the distribution of flow of raw gas through each branch duct having such combined heat transfer and flow resistance generating element. In addition, a larger portion of the flow resistance in the system may be utilized in a useful manner if combined heat transfer and flow resistance generating elements are provided on a plurality of the branch ducts.

In one embodiment, the first total flow resistance is at least 1.0% higher than the second total first flow resistance. The flow resistance for one branch duct is defined as the pressure drop from the branch duct inlet, at the smelting pot, to the branch duct outlet, at the common collecting duct, for a particular branch flow. Thus, when comparing the flow resistance for two different branch ducts provided with two different combined heat transfer and flow resistance generating elements, or if one branch duct is provided with a combined heat transfer and flow resistance generating element and another branch duct is not, the same flow for the ducts and the respective pressure drop from the respective branch duct inlet to the respective branch duct outlet should be used for the comparison.

In one embodiment, a second common collecting duct is adapted for channeling raw gas from another plurality of smelting pots to the gas cleaning device. The second collecting duct may be a mirrored configuration of the first collecting duct having the same number of smelting pots, branch ducts, and so on. It is possible to have the same flow volumes in the first and second common collecting ducts in order to have a balanced system. The flow from the first and second common collecting ducts may converge into a common suction duct before being channeled into the gas cleaning device. It is also possible to have a third and a fourth common collecting duct fluidly connected to the same gas cleaning device. One possible configuration may be to have the first common collecting duct and the third common collecting duct, each being associated with a sub-line of smelting pots, channeling raw gas to a first suction duct. Similarly, the second common collecting duct and the fourth common collecting duct, each being associated with a sub-line of smelting pots, may channel raw gas to a second suction duct. The raw gas channeled through the first and second suction ducts may converge into the common suction duct and be channeled into the gas cleaning device. In order to achieve a good distribution of raw gas in the raw gas collection system, it is possible to have the same flow resistance in all four collecting ducts.

In one embodiment, the combined heat transfer and flow resistance generating element comprises a heat exchanger. A heat exchanger provides an efficient exchange of heat between the branch flow of raw gas and a heat transfer medium. The heat exchanger may comprise a raw gas inlet chamber for receiving a branch flow of raw gas, and a plurality of mutually parallel raw gas cooling tubes that are spaced apart and through which the raw gas is passed. Such heat exchangers offer a low degree of scaling and low energy loss due to heat exchanger flow resistance. Accordingly, one may achieve low energy loss, while still maintaining a sufficient pressure drop to balance respective branch flow volumes. According to an embodiment, each raw gas cooling tube has a cooling tube inlet funnel for accelerating raw gas into the cooling tube. The inlet funnels may reduce scaling and may be better adapted for the subject purpose of tube flow resistance. At least one of the raw gas cooling tubes may be plugged. The flow resistance in a branch duct provided with a heat exchanger may be adapted by plugging one or more of the raw gas cooling tubes. Hence, by plugging various numbers of tubes, similar heat exchangers may be used for different branch ducts to specifically fine tune different flow resistances for each of the branch ducts. In particular, it may be useful to have similar heat exchangers provided on adjacent branch ducts and plug a same or differing number of cooling tubes on some of the heat exchangers and possibly not others. If so, the number of plugged cooling tubes may be increased in the downstream direction with respect to the direction of flow of raw gas in the common collecting duct. For instance, if each of the first and second branch ducts is equipped with a similar heat exchanger having a plurality of raw gas cooling tubes through which the raw gas is passed, one or several of the tubes of the heat exchanger in the first branch duct may be plugged, while the second is not or is plugged to a lesser extent, in order to achieve a higher flow resistance for the first branch duct than that for the second branch duct.

According to other aspects disclosed herein, the above-noted drawbacks and deficiencies of the prior art are at least partially overcome or alleviated by an aluminium production plant comprising a raw gas collection system as described above, wherein a plurality of the branch ducts are provided with a combined heat transfer and flow resistance generating element.

According to other aspects disclosed herein, the above-noted drawbacks and deficiencies of the prior art are substantially overcome or alleviated by a method for balancing volumes of flow of raw gas in a raw gas collection system useful for collecting raw gas from at least a first and a second aluminium smelting pot. The subject method comprises exposing a first branch flow of raw gas from the first smelting pot to a first flow resistance generated by a first combined heat transfer and flow resistance generating element before introducing the first branch flow into a common collecting duct at a first branch duct outlet; exposing a second branch flow of raw gas from the second smelting pot to a second flow resistance before introducing the second branch flow into said common collecting duct at a second branch duct outlet which is located upstream of the first branch duct outlet with respect to the flow of raw gas along the common collecting duct, the second flow resistance being lower than the first flow resistance. According to one embodiment the second flow resistance is, at least partly, generated by a second combined heat transfer and flow resistance generating element.

According to other aspects disclosed herein, the above-noted drawbacks and deficiencies of the prior art are substantially overcome or alleviated by the use of a plurality of combined heat transfer and flow resistance generating elements for balancing the flow volume of a plurality of branch flows of raw gas in a raw gas collection system useful for collecting raw gas from a plurality of aluminium smelting pots. A plurality of branch ducts is arranged between respective aluminium smelting pots and a common collecting duct. Thereby, the individual branch raw gas flow volumes through the plurality of branch ducts may be more uniformly balanced, and/or less energy may be consumed drawing or blowing gas.

BRIEF DESCRIPTION OF THE DRAWINGS

The above, as well as additional objects, features and advantages, will be better understood through the following illustrative and non-limiting detailed description of exemplary embodiments, with reference to the appended drawings in which like elements are numbered alike, wherein.

DETAILED DESCRIPTION OF AN EXEMPLARY EMBODIMENT

Figure 1:
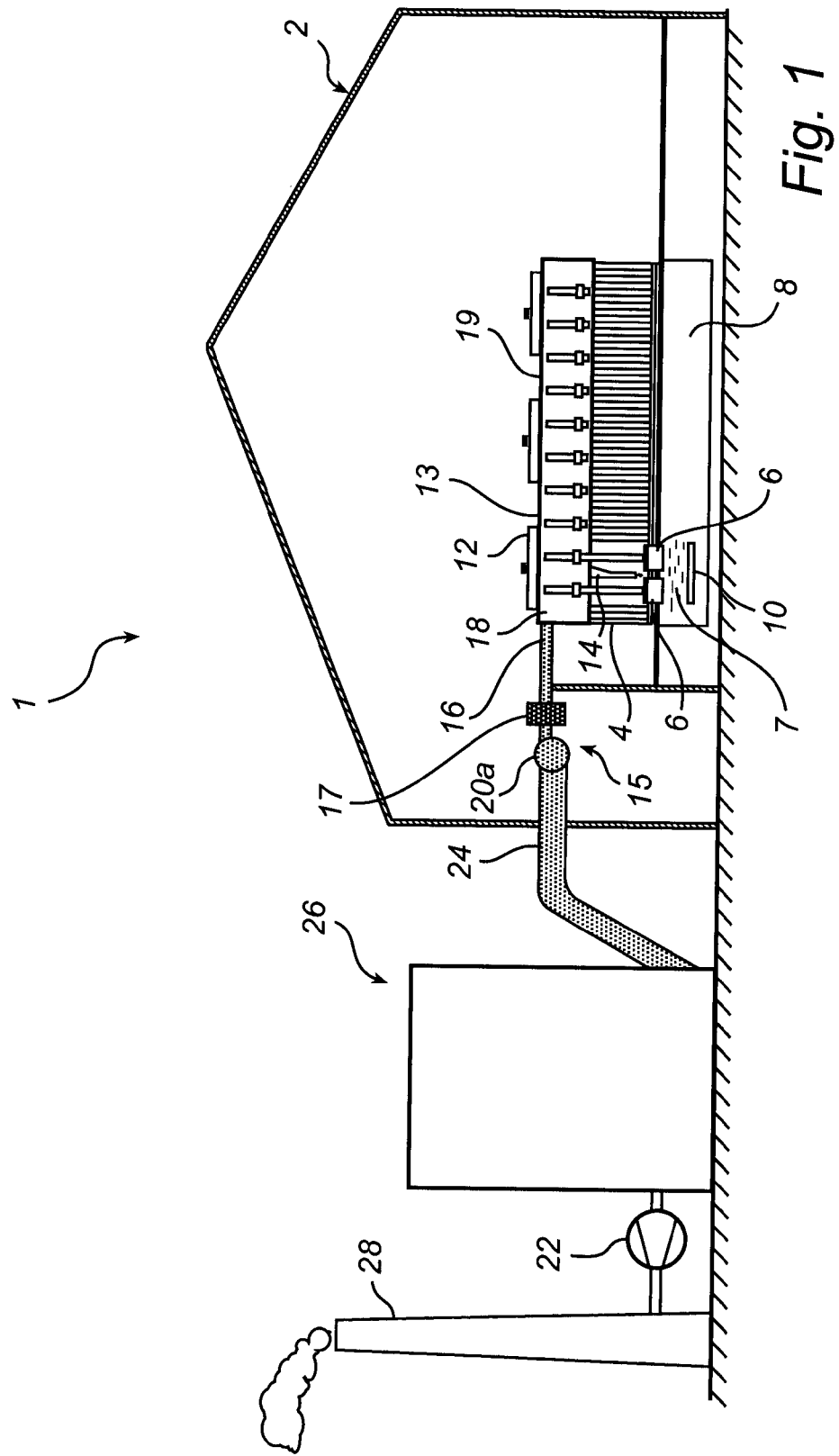
FIG. 1 is a schematic cross-section side view of a raw gas collection system.

FIG. 1 is a schematic side view representation of an aluminium production plant 1. The aluminium production plant 1 has an aluminium production electrolytic cell room 2 in which a number of aluminium production electrolytic cells, or smelting pots, 4 may be arranged. In FIG. 1 only one smelting pot 4 is depicted for purposes of clarity and simplicity, but it will be appreciated that the electrolytic cell room 2 may typically comprise 50 to 200 smelting pots 4. The smelting pot 4 comprises a number of anode electrodes 6, typically six to thirty anode electrodes that are typically arranged in two parallel rows extending along the length of the smelting pot 4, and extend into contents 7 of bath 8. One or more cathode electrodes 10 are also located within the bath 8. The process occurring in the smelting pot 4 may be the well-known Hall-Héroult process in which aluminium oxide dissolved in a melt of fluorine containing minerals, is electrolysed to form aluminium, hence the smelting pot 4 functions as an electrolysis cell. Powdered aluminium oxide is fed to the smelting pot 4 from a hopper 12 integrated in a superstructure 13 of the smelting pot 4. Powdered aluminium oxide is fed to the bath 8 by means of at least one feeder 14.

The electrolysis process occurring in the smelting pot 4 generates large amounts of heat, dust particles, and effluent gases including but not limited to hydrogen fluoride, sulphur dioxide and carbon dioxide. In this disclosure, the term raw gas denotes uncleaned gas from an industrial process, such as the hot flue gas from electrolytic smelting pot 4. A raw gas collection system 15 is configured to collect and channel raw gas from a plurality of smelting pots 4 to a gas cleaning unit 26, which cleans the raw gas so that it can safely be released to the atmosphere. A branch duct 16 is fluidly connected to an interior area 18 of a hood 19 of the smelting pot 4. The branch duct 16 is equipped with a combined heat transfer and flow resistance generating element 17, such as a heat exchanger 17', 17a-17d. The heat transfer and flow resistance generating element 17, or heat exchanger 17', 17a-17d, as well as the raw gas collection system 15 will be described in more detail below with reference to FIG. 2. Similar branch ducts 16 of several parallel smelting pots 4 are fluidly connected in parallel to one common collecting duct 20a. A fan 22 draws, via a suction duct 24 fluidly connected to duct 20a, raw gas from the common collecting duct 20a to a gas cleaning unit 26. The fan 22 is preferably located downstream with respect to raw gas flow of gas cleaning unit 26 to generate a negative pressure in gas cleaning unit 26. However, fan 22 could also, as an alternative, be located in suction duct 24.

An example of a suitable gas cleaning unit 26 is described in more detail in U.S. Pat. No. 5,885,539. Optionally, vent gases flowing out of gas cleaning unit 26 are further treated in a sulphur dioxide removal device (not shown), for example a seawater scrubber, such as that disclosed in U.S. Pat. No. 5,484,535, a limestone wet scrubber, such as that disclosed in EP 0 162 536, or another such device that utilizes an alkaline absorption substance for removing sulphur dioxide from vent gases. Optionally, vent gases flowing from gas cleaning unit 26, or the sulphur dioxide removal device as the case may be, pass through a carbon dioxide removal device (not shown), which removes at least some of the carbon dioxide from the vent gases. The carbon dioxide removal device may be of any type suitable for removing carbon dioxide gas from vent gases. An example of a suitable carbon dioxide removal system and process is that which is known as the chilled ammonia process disclosed in WO 2006/022885. Hence, cleaned vent gases, containing mainly nitrogen gas and oxygen gas, are released to the atmosphere via a fluidly connected smoke stack 28.

Figure 2:
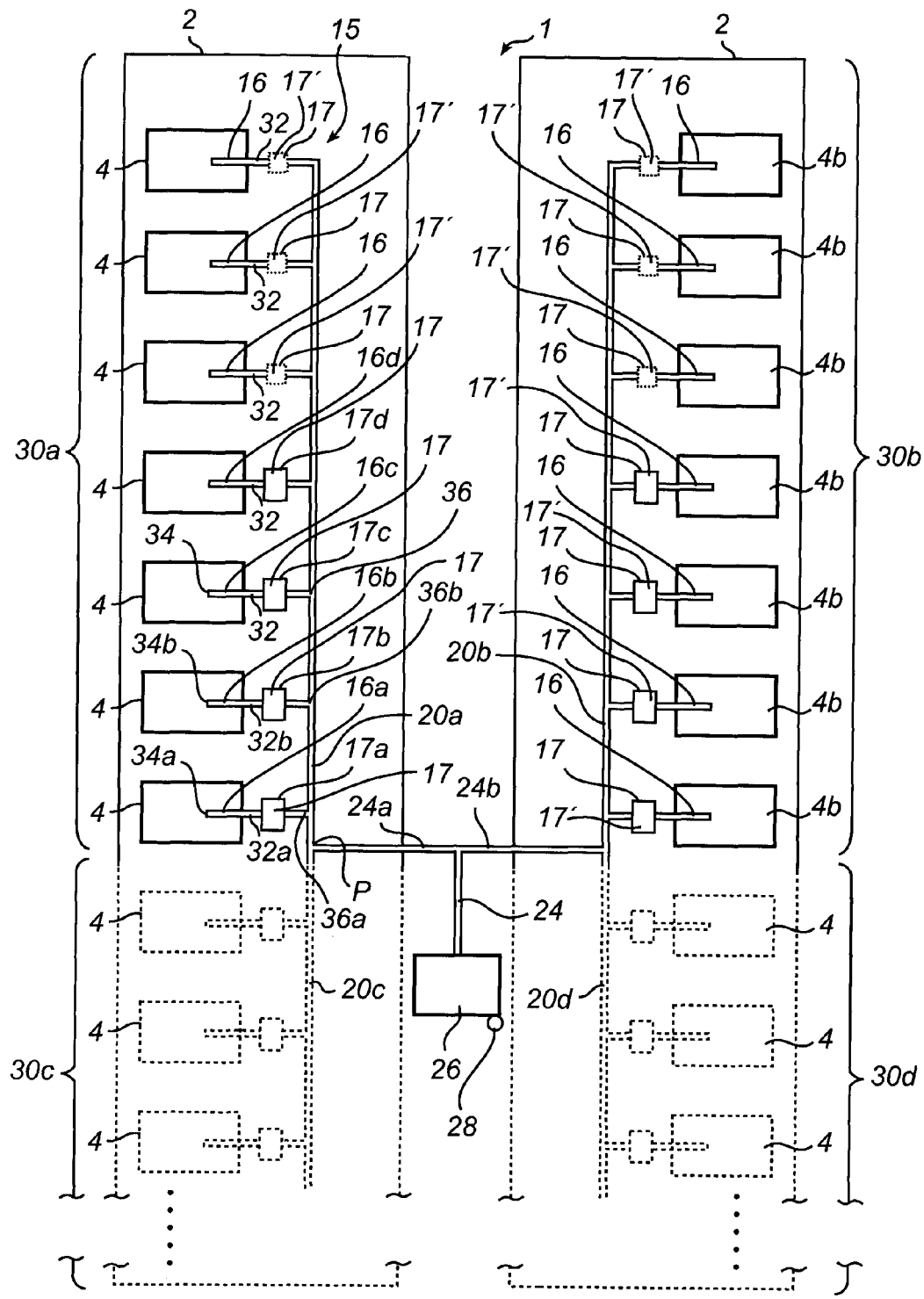
FIG. 2 is a diagrammatic top plan view of a raw gas collection system.

FIG. 2 illustrates, schematically, fourteen smelting pots 4, 4b, represented with solid lines in FIG. 2, that are of the same kind as smelting pot 4 shown in FIG. 1. The smelting pots 4, 4b are arranged in a first and a second row or sub-lines 30a, 30b, respectively, each having seven smelting pots 4, 4b. Each smelting pot 4, 4b is provided with a branch duct 16, 16a-d. The first sub-line 30a has a first common collecting duct 20a and the second sub-line 30b has a second common collecting duct 20b for channeling the raw gas from the branch ducts 16, 16a-d to a first and a second suction duct 24a, 24b, respectively. The flow of raw gas from the first and second suction ducts 24a, 24b converge in common suction duct 24 and is channeled into gas cleaning device 26.

FIG. 2 also depicts six smelting pots 4, 4b illustrated in dashed lines. The dashed lines indicate that the arrangement of FIG. 2 may optionally comprise a third and a fourth sub-line 30c, 30d along which respective smelting pots 4, 4b are arranged. A third collecting duct 20c of sub-line 30c is fluidly connected to the same suction duct 24a as the first collecting duct 20a. Thus, the flow of raw gas from the first collecting duct 20a and the flow of raw gas from the third collecting duct 20c converge in the first suction duct 24a. Likewise, the second suction duct 24b receives the flow of raw gas from both the second collecting duct 20b and a fourth collecting duct 20d of sub-line 30d. In other words, the flow of raw gas from the first and third collecting ducts 20a, 20c and from the second and fourth collecting ducts 20b, 20d, respectively, on each side of the centrally located gas cleaning unit 26, is channeled into the same suction duct 24a and 24b, respectively. The first and third sub-lines 30a, 30c are placed in the same cell room 2 of an aluminium production plant 1 as described with reference to FIG. 1. The second and fourth sub-lines 30b, 30d are placed in another cell room 2.

The two elongated electrolytic cell rooms 2 are arranged in parallel having a common central structure holding for instance the gas cleaning unit 26 and the smokestack 28. The branch ducts 16, 16a-d of one cell room 2 are arranged in parallel to each other, and are connected in parallel to each respective collecting duct 20a-d. The collecting ducts 20a-d are arranged perpendicular to the branch ducts 16.

The flow of raw gas produced in the respective smelting pots 4, 4b is channeled from first and second suction ducts 24a, 24b to common suction duct 24 and further on to gas cleaning unit 26. The raw gas is processed in gas cleaning unit 26 and is then released to the atmosphere via smokestack 28. Only six smelting pots 4, 4b are shown dashed in FIG. 2, however the dashed sub-lines 30c, 30d should preferably comprise the same number of smelting pots 4, 4b as the solid line sub-lines 30a, 30b, and function and be equipped like that of the solid line sub-lines 30a, 30b to have a balanced volume of flow of raw gas flowing in the raw gas collection system 15.

FIG. 2 illustrates four sub-lines 30a-d of smelting pots 4, 4b, however an aluminium production plant 1 may typically comprise from four to 100 sub-lines of smelting pots 4, but for clarity reasons, only four sub-lines 30a-d are illustrated in FIG. 2. Moreover, even though only a few smelting pots 4 are illustrated in each sub-line 30a-d of FIG. 2, one sub-line may typically comprise 25 to 100 smelting pots 4. When illustrated as a top view, the structure illustrated in FIG. 2 having four sub-lines 30a-d of smelting pots 4 fluidly connected to a common suction duct 24 and gas cleaning unit 26 appears "H"-shaped, in a manner well known to those skilled in the art.

As mentioned above, the raw gas collection system 15 is used for collecting raw gas generated in the smelting pots 4 and for channeling the raw gas to gas cleaning unit 26. The raw gas collection system 15 is described herein with reference to the first sub-line 30a for purposes of simplicity and clarity. However, it should be understood that the raw gas collection system 15 may collect and balance raw gas flow from more than one sub-line. It is possible to arrange and operate all sub-lines in the same manner as is described below for sub-line 30a.

The raw gas collection system 15 shown in FIG. 2 has one branch duct 16, 16a-d provided at each smelting pot 4. Each branch duct 16, 16a-d is provided with a respective branch duct inlet 34, 34a, 34b and a respective branch duct outlet 36, 36a, 36b that fluidly connects the respective branch duct 16, 16a-d to the respective smelting pot 4 and to the first common collecting duct 20a, respectively. Each branch duct 16, 16a-d channels a branch flow 32, 32a, 32b of raw gas from the respective smelting pot 4 to the first common collecting duct 20a. All smelting pots 4 in the first sub-line 30a are fluidly connected to the first common collecting duct 20a. The raw gas collection system 15 further includes the first suction duct 24a into which the raw gas coming from the smelting pots 4 is channeled via the fluidly connected first collecting duct 20a. The flow of raw gas from the first suction duct 24a is forwarded to common suction duct 24 which channels the raw gas to gas cleaning unit 26. The raw gas is processed, in accordance with the description above, in gas cleaning unit 26 and the cleaned gas is released into the atmosphere via smokestack 28.

Combined heat transfer and flow resistance generating elements 17, such as heat exchangers 17', 17a-d are provided on some of the branch ducts 16, 16a-d illustrated in FIG. 2. In the embodiment shown in FIG. 2, for the first sub-line 30a, each of the four branch ducts 16a-d that are fluidly connected to the first collecting duct 20a closest to that position, P, at which the first collecting duct 20a connects to the first suction duct 24a, is equipped with a respective heat exchanger 17', 17a-d. As described with reference to FIG. 1, large amounts of heat are generated in the smelting pots 4 during the electrolysis process. However, in order to efficiently clean the raw gas, by for instance dry scrubbing, the raw gas is preferably cooled before entering gas cleaning unit 26. The respective heat exchangers 17a-d serve to lower the temperature of the respective branch flows 32, 32a-b of raw gas channeled through branch ducts 16a-d before the raw gas passes on, via ducts 20a, 24a, 24 to gas cleaning unit 26. The remaining three branch ducts 16 of the first sub-line 30a may also, optionally, be equipped with heat exchangers 17', which are illustrated in FIG. 2 with dashed lines at those respective branch ducts 16 of sub-line 30a that are most distant from the position P at which the first collecting duct 20a connects to the first suction duct 24a. Typically, at least 10% of all branch ducts 16, 16a-d are provided with a heat transfer and flow resistance generating element 17. It is possible to have all branch ducts 16, 16a-d provided with heat transfer and flow resistance generating element 17. Often about 10-90%, more typically 20-60%, of all branch ducts 16, 16a-d are provided with a heat transfer and flow resistance generating element 17.

In addition to cooling the raw gas, heat exchangers 17a-d are used for balancing the flow volume of raw gas in raw gas collection system 15. The raw gas collection system 15 operates by under-pressure, which is created by a fan 22 (FIG. 1) at gas cleaning unit 26. Hence, the raw gas collection system 15 actively draws raw gas from smelting pots 4, via branch ducts 16, 16a-d, first collecting duct 20a, first suction duct 24a and common suction duct 24, into gas cleaning unit 26. According to well known fluid principles, raw gas originating from a smelting pot 4 a relatively long distance from gas cleaning unit 26 will be exposed to a higher pressure drop than raw gas originating from a smelting pot 4 a relatively shorter distance from gas cleaning unit 26. Thus, if no flow resistance generating elements were used in the raw gas collection system 15, the fan 22 would draw more raw gas from the more closely positioned smelting pots 4 than from the more remotely positioned smelting pots 4, leading to an uneven venting of the smelting pots 4.

Each of the heat exchangers 17', 17a-d is used for generating a flow resistance in the respective branch flow 32, 32a-b of raw gas. It is possible to have several different sorts of heat exchangers 17', 17a-d so that the flow resistance within each particular branch duct 16, 16a-d is decreasing with increasing distance from the respective branch duct outlet 36, 36a-b to the position P at which the first collecting duct 20a connects to the first suction duct 24a. The distance from the respective branch duct outlet 36, 36a-b to the position P is referred to herein as the "fluid distance", i.e., the distance measuring from raw gas entry into the first common collecting duct 20a at branch duct outlet 36, 36a-b to position P.

By way of example, for a first branch flow 32a of raw gas of 10 000 Nm³/h (normal cubic meters per hour) it may be preferred to have a flow resistance of about 700 Pa across the first heat exchanger 17a arranged in first branch duct 16a, which is the branch duct 16 located closest to the position P. A flow resistance across the second heat exchanger 17*b* arranged in second branch duct 16*b*, located just upstream with respect to the flow of raw gas along the common collecting duct 20*a*, of the first branch duct 16*a*, is lower than the flow resistance across the first heat exchanger 17*a*, resulting in that the first total flow resistance may be about 1.0-20% higher than the second total flow resistance. With such a difference in flow resistance across heat exchangers 17*a* and 17*b*, the higher flow resistance across first heat exchanger 17*a* compensates for the longer fluid distance for second branch duct 16*b*. Accordingly, raw gas flows 32*a* and 32*b* substantially equal in volume are drawn from branch ducts 16*a* and 16*b*. Similarly, the flow resistance across heat exchangers 17*c* and 17*d* would preferably each be still lower respectively, to compensate for the still longer fluid distances associated with branch ducts 16*c* and 16*d*. Hence, a relatively long fluid distance is compensated for by having a lower pressure drop across the respective heat exchanger 17', 17*a-d*.

For those branch ducts 16 having longer fluid distances, it may be preferred to have very low flow resistances to compensate therefore. Hence, the branch ducts 16 with the longest fluid distances from the point P may not be equipped with a heat exchanger at all, or may be equipped with optional heat exchangers 17' having a relatively low pressure drop across them, as illustrated in dashed lines in FIG. 2.

As described, the flow resistance across each heat exchanger 17', 17*a-d* may be controlled and adjusted to suit the location of each respective branch duct 16, 16*a-d*. Cooling of the raw gas in a branch duct 16 may be correlated to the pressure drop across the heat exchanger 17' in question. Hence, the raw gas 32*a* of branch duct 16*a* including a relatively high pressure drop heat exchanger 17*a* would normally be cooled more efficiently than raw gas 32 of a branch duct 16 having no heat exchanger at all, or having a low pressure drop heat exchanger 17'. The raw gas finally arriving at gas cleaning unit 26 will be a mixture of all individual raw gas flows, and the efficient cooling in closest branch flows 32*a*, 32*b* could be adapted to compensate for the lower degree of cooling of longest fluid distance branch flows 32, such that the combined raw gas eventually entering gas cleaning unit 26 is within a desired temperature range.

It is not necessary that branch flows 32, 32*a*, 32*b* become exactly equal in volume due to the presence of heat exchangers 17', 17*a-d*. In this disclosure, the term "balancing" or the like means to reduce any difference between respective magnitudes, but not necessarily eliminating all difference therebetween.

It may also be acceptable that two or several adjacent branch ducts, for example branch ducts 16*a* and 16*b*, among a plurality of branch ducts, have the same flow resistance.

In the arrangement described in FIG. 2, the smelting pots 4, 4*b* may be arranged along a sub-line 30*a-d*, where all smelting pots 4, 4*b* in one sub-line 30*a-d* are fluidly connected to respective collecting ducts 20*a-d*, for channeling the raw gas from the smelting pots 4, 4*b* via the respective branch ducts 16, 16*a-d*, to gas gleaning unit 26. In order to have a well balanced raw gas collection system 15 it may be desirable to have all smelting pots 4, 4*b* of one sub-line 30*a-d* being operated under the same conditions, i.e., the same underpressure or suction. The raw gas from each smelting pot 4, 4*b* is channeled a distance to reach gas cleaning unit 26, which distance varies depending on the location of the smelting pot 4, 4*b* along sub-line 30*a-d*. Thus, in order to have substantially the same underpressure or suction on all smelting pots 4, 4*b* of the same sub-line 30*a-d* the flow resistance in branch ducts 16, 16*a-d* needs be adjusted accordingly. By combining relatively long fluid distances with relatively low pressure drops across heat exchangers 17', 17*a-d* for specific branch ducts 16, 16*a-d*, and relatively short fluid distances with relatively high pressure drops across heat exchangers 17', 17*a-d* for specific branch ducts 16, 16*a-d*, it is possible to achieve almost the same suction/underpressure conditions, for all of the smelting pots 4, 4*b* of that sub-line 30*a-d*.

In an aluminium production plant 1 with several sub-lines 30*a-d* connected in pairs to form, for example, a line or a structure "H"-shaped in top view, in a manner well known to those skilled in the art, and illustrated in FIG. 2, it is preferred that each such sub-line 30*a-d* has substantially the same suction, such that the sub-lines 30*a-d* are likewise balanced with each other.

Figure 3A:
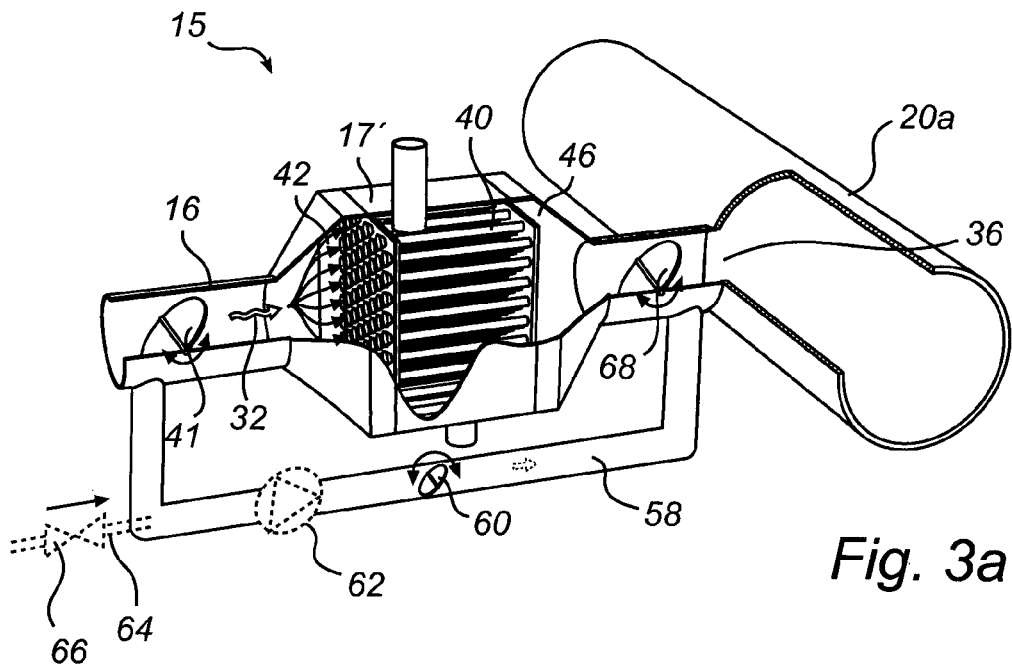
FIG. 3a is a schematic top view of a portion of the raw gas collection system of FIG. 2.
Figure 3B:
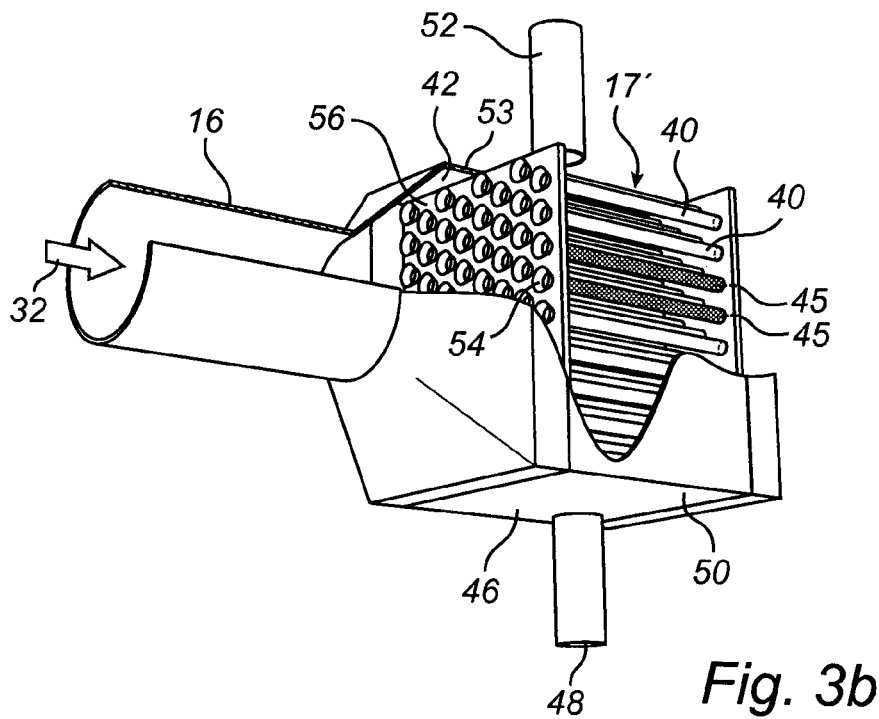
FIG. 3b is a schematic view, in perspective, of a portion of the raw gas collection system of FIG. 2.

FIGS. 3*a-b* show schematic views of a tube heat exchanger 17' which may be used in the raw gas collection system 15. The heat exchanger 17' in FIG. 3*a* is located in one branch duct 16, close to the branch duct outlet 36 where the flue gas is forwarded into the common collecting duct 20*a*. The heat exchanger 17' has a plurality of cooling tubes 40 through which the branch flow 32 of raw gas is passed. The cooling tubes 40 are aligned with the direction of branch flow 32 of raw gas inside the branch duct 16. The heat transfer medium, which could, for example, be water, air or oil, is passed on the outside of the cooling tubes 40. Such a tube heat exchanger is described in WO 2008/113496. The length of each cooling tube 40 may be about 0.5-2 m and the diameter of cooling tubes 40 may be about 12-55 mm (millimeters). More typically, cooling tubes 40 may have a diameter of between 20 and 30 mm. Steel is a suitable material for cooling tubes 40. In FIGS. 3*a-b* only a few cooling tubes 40 are shown in the heat exchanger 17'. However, according to an embodiment, each heat exchanger 17' may, by way of example, be equipped with between 100 and 3000 cooling tubes 40 in order to generate a suitable balance between flow resistance and heat exchange efficiency. More typically, each heat exchanger 17' may be equipped with between 100 and 600 cooling tubes 40.

It is possible to have similar heat exchangers 17' provided at branch ducts 16 for two or several adjacent smelting pots 4 and fine tune the flow resistance for the respective branch flows 32 using for instance a damper 41, which can be adjusted as indicated by an arrow in FIG. 3*a*, to adjust to the exact pressure drop desired for branch flow 32 through branch duct 16. Hence, it is not necessary to have a specific heat exchanger 17' with a specific pressure drop for each individual branch duct 16. In addition, it is possible that several of the branch ducts 16 are equipped with heat exchangers 17', which give the same or similar flow resistance. If so, at least one other branch duct 16 will be equipped with a heat exchanger 17' of a lower, or higher, flow resistance. As mentioned above, it is also possible that one or several of the branch ducts 16 are not equipped with a heat exchanger 17'. As is best illustrated in FIG. 3*b*, the tube heat exchanger 17' of FIGS. 3*a-b* comprises a raw gas inlet chamber 42 for receiving the branch flow 32 of raw gas, and a plurality of mutually parallel, spaced apart, raw gas cooling tubes 40. Cooling tubes 40 are housed in a coolant housing 46. Coolant housing 46 forms a fluid-tight compartment around the plurality of cooling tubes 40, thereby allowing a fluid coolant, such as water, to be in direct thermal contact with the exterior surface of the cooling tubes 40. Thereby, cooling tubes 40 act as heat transfer elements. For purpose of clarity, heat exchanger 17' in FIG. 3*b* is illustrated with parts of coolant housing 46 "broken away". For the same purpose, heat exchanger 17' is illustrated in FIG. 3*b* as having only about 40 cooling tubes 40. In the illustrated embodiment, cooling tubes 40 have a circular cross-section.

Coolant flows into heat exchanger 17' shown in FIG. 3b via a coolant inlet 48 provided in a lower side wall 50 of the coolant housing 46, and is extracted from the heat exchanger 17' via a coolant outlet 52 provided in an upper side wall 53 of the coolant housing 46. According to one embodiment, wall 50 and wall 53 are opposed. Heat transferred to the coolant in heat exchanger 17' may be used elsewhere where heat may be needed, such as for heating buildings, desalinating water, or the like.

The multiple parallel cooling tubes 40 in heat exchanger 17' channel and accelerate the flow of raw gas along the length thereof, thereby obtaining a relatively well-directed, uniform raw gas flow therethrough. The uniformity and speed of the raw gas flow through cooling tubes 40 results in a relatively low degree of scaling, i.e. a low degree of dust and fouling deposits on cooling tube 40 inner surfaces.

Each cooling tube 40 is provided with a cooling tube inlet funnel 54, i.e., a widened cooling tube inlet, fixedly connected to cooling tube inlet plate 56. Inlet funnels 54 accelerate the flow of raw gas entering cooling tubes 40, thereby further reducing the risk of scaling inside tubes 40. Although inlet funnels 54 illustrated in FIG. 3b are conical in shape, inlet funnels may be constructed in other shapes, such as for example, a bell-shape.

When utilizing tube heat exchangers 17' of the above referenced type, a simple way to increase the pressure drop across the heat exchanger 17' is to plug one or several of the cooling tubes 40. In FIG. 3b two plugged tubes 45 are illustrated. No raw gas can flow through plugged tubes 45, which means that the amount of gas, flowing through the remaining cooling tubes 40 will increase. Such an increased gas flow will result in an increased flow velocity, in m/s, in the remaining cooling tubes 40, which will result in an increased pressure drop across those cooling tubes 40.

Hence, for example, it would be possible to plug 0% of all cooling tubes 40 of heat exchanger 17d utilized in branch duct 16d, 4% of all cooling tubes 40 of the heat exchanger 17c utilized in branch duct 16c, 8% of all cooling tubes 40 of the heat exchanger 17b utilized in branch duct 16b, and 12% of all cooling tubes 40 of the heat exchanger 17a utilized in branch duct 16a, to compensate for varying fluid distances associated with each branch duct 16a-d, as illustrated in FIG. 2. As such, substantially the same level of suction is achieved in each branch duct 16a-d. It will be appreciated that plugging a number of tubes 45 of the heat exchanger 17' would also reduce the heat transfer efficiency of heat exchanger 17'. An alternative method of achieving a higher pressure drop across, for example, heat exchanger 17a compared to heat exchanger 17b, is to make the cooling tubes 40 of heat exchanger 17a longer and/or of a smaller diameter, than those of heat exchanger 17b. Such modifications, e.g., longer and/or narrower cooling tubes 40 of heat exchanger 17a, would increase the heat transfer efficiency of heat exchanger 17a, and may be used to compensate for efficiency lost due to plugged cooling tubes 45. Hence, there are various modifications that could be utilized alone, or in combination with others, for achieving a desired pressure drop across a heat exchanger 17', 17a-d.

FIG. 3a illustrates an optional by-pass duct 58. When maintaining smelting pot 4, illustrated in FIG. 1, it is often necessary to increase the ventilation of hood 19 to make it possible for operators to perform their maintenance tasks. The by-pass duct 58 has a lower pressure drop than heat exchanger 17' and is provided with a by-pass damper 60. During maintenance of smelting pot 4 the by-pass damper 60 is opened. As an effect of opening by-pass damper 60 the pressure drop over branch duct 16 is reduced, resulting in an increase in the magnitude of the branch flow 32 through branch duct 16. Typically, the magnitude of branch flow 32 through branch duct 16 with the damper 60 open could be 175% of the branch flow 32 with the damper 60 closed. If a branch flow 32 corresponding to 175% of the flow during normal operation would not be sufficient for maintenance work, an optional fan 62 could be arranged on by-pass duct 58 for forcing gas through the branch duct 16 during maintenance. With the fan 62, the magnitude of branch flow 32 through branch duct 16 with damper 60 open and fan 62 in operation could be 200 to 400% of the branch flow 32 with the damper 60 closed. As an alternative to fan 62 an ejector 64 could be utilized for increasing the flow through by-pass duct 58 during maintenance. A valve 66 would then be arranged for controlling the amount of pressurized air supplied to the ejector 64, as illustrated by means of an arrow. When supplied with pressurized air the ejector 64 would force gas through by-pass duct 58. The by-pass duct 58 could also be utilized in situations of maintaining the heat exchanger 17' itself. By opening damper 60 and closing damper 41 and also a further damper 68 arranged downstream of heat exchanger 17' it becomes possible to access the heat exchanger 17' for maintenance, while still maintaining the branch flow 32, via by-pass duct 58.

Even though not illustrated herein, it is appreciated that each one of the heat exchangers in one sub-line, or in several sub-lines, may be thermally connected to an individual or a central heat transfer medium conduit. The heat released from each branch flow of raw gas may be made use of, for instance for energy to be used in connection with the smelting pots.

It will be appreciated that many modifications of the embodiments described hereinbefore may be made without departing from the scope of the subject disclosure.

For example, the arrangement illustrated in FIG. 2 comprises a single gas cleaning unit 26; however the arrangement may comprise multiple gas cleaning units 26. Moreover, each sub-line 30a-d may be fluidly connected to a single gas cleaning unit via multiple suction ducts, and/or to multiple gas cleaning units.

As an alternative to using similar cooling tubes 40 in a tube heat exchanger 17', heat exchanger 17' may be designed using cooling tubes 40 having properties, such as tube length, shape or width, that vary as a function of each tube's location within the heat exchanger 17', so as to obtained any particular, desired raw gas flow profile and pressure drop of the raw gas flow. The invention is not limited to use a tube heat exchanger, but any suitable kind of heat exchanger, or combined heat transfer and flow resistance generating element may be used.

The combined heat transfer and flow resistance generating elements 17 are provided at the respective branch duct 16, 16a-d, downstream of the respective smelting pot 4, 4b and upstream of the common collecting duct 20a-d. However, the combined heat transfer and flow resistance generating element 17 may be provided very close to or even at the branch duct inlet 34, 34a-b or outlet 36, 36a-b. Thus, the expression "provided at the branch duct" should in this context be interpreted as being provided anywhere along the branch duct 16, 16a-d, or at the branch duct inlet 34, 34a-b, or at the branch duct outlet 36, 36a-b, such that it may generate a flow resistance for and exchange heat with a respective branch flow 32, 32a-b. The heat transfer medium may be any suitable heat transfer medium, for instance water, air or oil.

In one embodiment, at least one of the branch duct outlets is equipped with an alignment section for aligning the direction of the branch flow with the direction of flow in the first common collecting duct, and a constriction for accelerating the branch flow into the first common collecting duct. WO 03/001106 shows a possible embodiment for such alignment section. It is possible that the constriction is formed by the combined heat transfer and flow resistance generating element.

Heat exchangers 17 may not need to be of the tube type described herein; they may be of any type known to those skilled in the art.

It is not necessary that all branch ducts 16 near the point P (FIG. 2) be provided with a respective heat exchanger 17' in order to obtain a suitable balancing of branch flows 32 volume; as an exemplary alternative, a few selected branch ducts 16 may be provided with heat exchangers 17, and the pressure drop across the remaining branch ducts 16 may be controlled in any other manner, e.g. by means of a damper.

To summarize, a raw gas collection system 15 for collecting raw gas from a plurality of aluminium smelting pots 4 comprises a plurality of branch ducts 16, 16a-d. Each such branch duct is fluidly connected to a respective aluminium smelting pot 4. A common collecting duct 20a is fluidly connected to said plurality of branch ducts 16, 16a-d to channel the raw gas to a gas cleaning unit 26. A first branch duct 16a is equipped with a first combined heat transfer and flow resistance generating element 17 adapted to generate, in combination with the first branch duct 16a, a first total flow resistance. The first total flow resistance is larger than a second total flow resistance of a second branch duct 16b being located upstream with regard to raw gas flow along the common collecting duct 20a, of the first branch duct 16a.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A raw gas collection system for collecting raw gas from a plurality of aluminium smelting pots comprising:
a plurality of branch ducts each fluidly connected to a respective aluminium smelting pot of said plurality of aluminium smelting pots, for each of the branch ducts to channel raw gas from a respective branch duct inlet at the smelting pot to a respective branch duct outlet;
a first common collecting duct fluidly connected to said plurality of branch ducts at the respective branch duct outlets to channel the raw gas from the branch duct outlets toward a gas cleaning unit;
a first branch duct of the plurality of branch ducts being provided with a first heat exchanger to generate, in combination with the first branch duct, a first total flow resistance to transfer heat from a first branch flow of raw gas to a heat transfer medium; and
a second branch duct of the plurality of branch ducts provided with a second heat exchanger to generate, in combination with the second branch duct, a second total flow resistance and to transfer heat from a second branch flow of raw gas to a heat transfer medium, the second branch duct being connected to the common collecting duct upstream of the first branch duct with respect to a direction of flow of the raw gas in the collecting duct; and
wherein the first and second heat exchangers are configured so that the first total flow resistance is larger than the second total flow resistance.

2. The raw gas collection system according to claim 1, wherein at least 10% of all branch ducts of said plurality of branch ducts are provided with a respective combined heat transfer and flow resistance generating element.

3. The raw gas collection system according to claim 1, wherein said plurality of branch ducts comprises 5-500 branch ducts fluidly connected to the first common collecting duct, each arranged at a smelting pot, with at least 10% of the branch ducts of said plurality of branch ducts including a respective combined heat transfer and flow resistance generating element and the respective total flow resistance of each branch duct provided with a respective combined heat transfer and flow resistance generating element is higher than the total flow resistance of an upstream branch duct.

4. The raw gas collection system according to claim 1, wherein said first total flow resistance is at least 1.0% higher than said second total flow resistance.

5. The raw gas collection system according to claim 1, wherein each of the plurality of branch ducts is provided with a respective heat exchanger.

6. The raw gas collection system according to claim 1, wherein at least one of the branch ducts comprises a damper for fine tuning flow resistance of the respective branch flow.

7. The raw gas collection system according to claim 1, further comprising a second common collecting duct for channeling raw gas from another plurality of smelting pots to said gas cleaning unit.

8. The raw gas collection system according to claim 1, wherein the first heat exchanger comprises a plurality of mutually parallel raw gas cooling tubes with at least one raw gas cooling tube plugged to achieve a desired flow resistance in the branch duct associated with the plugged raw gas cooling tube.

9. The raw gas collection system according claim 8, wherein the first heat exchanger comprises a raw gas inlet chamber for receiving a branch flow of raw gas, and a plurality of mutually parallel raw gas cooling tubes.

10. A raw gas collection system for collecting raw gas from a plurality of aluminium smelting pots comprising:
a plurality of branch ducts each fluidly connected to a respective aluminium smelting pot of said plurality of aluminium smelting pots, for each of the branch ducts to channel raw gas from a respective branch duct inlet at the smelting pot to a respective branch duct outlet;
a first common collecting duct fluidly connected to said plurality of branch ducts at the respective branch duct outlets to channel the raw gas from the branch duct outlets toward a gas cleaning unit; and
a first branch duct is provided with a first combined heat transfer and flow resistance generating element to generate, in combination with the first branch duct, a first total flow resistance larger than a second total flow resistance of a second branch duct and to transfer heat from a first branch flow of raw gas to a heat transfer medium, wherein the first combined heat transfer and flow resistance generating element comprises a heat exchanger;
wherein the heat exchanger comprises a plurality of mutually parallel raw gas cooling tubes with at least one raw gas cooling tube plugged to achieve a desired flow resistance in the associated branch duct.

11. An aluminium production plant comprising a raw gas collection system according to claim 10, wherein at least 10% of the branch ducts are provided with a combined heat transfer and flow resistance generating element.

12. A method for balancing a flow of raw gas in a raw gas collection system for collecting raw gas from at least a first aluminium smelting pot and a second aluminium smelting pot comprising:

exposing a first branch flow from the first smelting pot to a first total flow resistance generated by a first heat exchanger in combination with a first branch duct before introducing the first branch flow into a common collecting duct; and exposing a second branch flow from the second smelting pot to a second total flow resistance generated by a second heat exchanger in combination with a second branch duct before introducing the second branch flow into said common collecting duct upstream, with respect to the direction of raw gas flow in the common collecting duct, of the first branch flow, the second heat exchanger configured so that the second total flow resistance is lower than the first total flow resistance.

\* \* \* \* \*